(12) United States Patent
Iwai et al.

(10) Patent No.: US 10,371,810 B2
(45) Date of Patent: Aug. 6, 2019

(54) RADAR DEVICE

(71) Applicant: Panasonic Intellectual Property Management Co., Ltd., Osaka (JP)

(72) Inventors: Hiroshi Iwai, Kanagawa (JP); Hirofumi Nishimura, Kanagawa (JP); Asako Hamada, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 542 days.

(21) Appl. No.: 15/163,125

(22) Filed: May 24, 2016

(65) Prior Publication Data

US 2017/0212231 A1 Jul. 27, 2017

(30) Foreign Application Priority Data

Jun. 1, 2015 (JP) .................. 2015-111270

(51) Int. Cl.
| | |
|---|---|
| *G01S 13/58* | (2006.01) |
| *G01S 7/292* | (2006.01) |
| *G01S 13/42* | (2006.01) |
| *G01S 13/93* | (2006.01) |
| *G01S 7/41* | (2006.01) |

(52) U.S. Cl.
CPC .......... *G01S 13/582* (2013.01); *G01S 7/2921* (2013.01); *G01S 7/415* (2013.01); *G01S 13/42* (2013.01); *G01S 13/931* (2013.01); *G01S 2013/9375* (2013.01); *G01S 2013/9385* (2013.01)

(58) Field of Classification Search
None
See application file for complete search history.

(56) References Cited

U.S. PATENT DOCUMENTS

| | | | | |
|---|---|---|---|---|
| 6,232,910 B1 * | 5/2001 | Bell | .................. | B60Q 1/0023 342/104 |
| 8,427,361 B2 * | 4/2013 | Sato | ..................... | G01S 7/354 342/107 |
| 9,372,260 B2 * | 6/2016 | Kambe | ............... | G01S 13/345 |

(Continued)

FOREIGN PATENT DOCUMENTS

| | | |
|---|---|---|
| JP | 7-098375 A | 4/1995 |
| JP | 2008-051771 A | 3/2008 |

(Continued)

*Primary Examiner* — Marcus E Windrich
(74) *Attorney, Agent, or Firm* — Seed IP Law Group LLP (57) ABSTRACT

An object detection device that detects an obstacle in an object by transmitting a signal by a transmission unit, and using reflection signals by a receiving unit, the device including: a sidewall detection circuit that determines whether the vehicle is running on a road having the sidewall, based on an azimuth angle of the object, a distance from the vehicle to the object, Doppler velocities of the reflection signals, and intensities of the reflection signals; a multiple reflection position detection circuit that detects multiple reflection wave components from the reflection signals, based on the Doppler velocities, the azimuth angle, and the reflection intensities when the road is determined to have the sidewall; a detection exclusion range setting circuit that removes the detected multiple reflection wave components from the reflection signals; and an object detection circuit that detects the object using the reflection signals with the multiple reflection wave components removed.

4 Claims, 6 Drawing Sheets

(56) References Cited

U.S. PATENT DOCUMENTS

| | | | | |
|---|---|---|---|---|
| 9,971,022 | B2* | 5/2018 | Nishio | G01S 7/415 |
| 2010/0295722 | A1 | 11/2010 | Shingyoji | |
| 2013/0082868 | A1* | 4/2013 | Ohkado | G01S 7/411 |
| | | | | 342/70 |
| 2013/0113647 | A1* | 5/2013 | Sentelle | G01S 13/32 |
| | | | | 342/22 |
| 2013/0314272 | A1* | 11/2013 | Gross | G01S 13/931 |
| | | | | 342/70 |
| 2015/0070207 | A1* | 3/2015 | Millar | G01S 13/006 |
| | | | | 342/174 |
| 2017/0343650 | A1* | 11/2017 | Kanemaru | G01S 13/931 |
| 2018/0341012 | A1* | 11/2018 | Takada | G01S 13/52 |
| 2019/0107842 | A1* | 4/2019 | Miura | G05D 1/0246 |

FOREIGN PATENT DOCUMENTS

| | | |
|---|---|---|
| JP | 2008-152388 | 7/2008 |
| JP | 2010-271083 A | 12/2010 |
| JP | 2013-257249 A | 12/2013 |

* cited by examiner

RADAR DEVICE

BACKGROUND

1. Technical Field

The present disclosure relates to an object detection device that detects an object such as an obstacle around a vehicle.

2. Description of the Related Art

In recent years, the technology of monitoring the presence of an obstacle such as a preceding vehicle, a parked vehicle, or a pedestrian using a monitoring unit such as a radar device or a camera to perform inter-vehicle distance control and/or collision prediction control has been in practical use. In particular, in the case where a radar device is used as a monitor unit, when a vehicle is running on a road having a sidewall, such as a tunnel, a highway, or a road restricted to vehicles, it may happen that a radar wave reflected by the sidewall hits an obstacle, and is reflected again by the sidewall and received by the device. Consequently, the radar device as a monitor unit may erroneously detect the position of an obstacle or the like.

However, for instance, Japanese Patent No. 4930033 has disclosed a method of reducing occurrence of malfunction of a radar on the front lateral side by stopping its operation when a vehicle runs on a road having a sidewall, such as a highway or a road restricted to vehicles.

SUMMARY

The technology disclosed in Japanese Patent No. 4930033 is such that at a location where a sidewall is present, the operation of the radar on the front lateral side is stopped and monitoring is performed by a front radar instead. In such a case, however, it is difficult to detect an obstacle near the front lateral side of the vehicle.

One non-limiting and exemplary embodiment provides an object detection device that is capable of detecting an obstacle with high accuracy even when a vehicle is running on a road having a sidewall.

In one general aspect, the techniques disclosed here feature an object detection device including: sidewall detection circuitry which, in operation, determines whether or not a vehicle which is mounted a radar device is running on a road having a sidewall including in a plurality of objects, based on a plurality of azimuth angles of the plurality of objects with respect to the vehicle, a plurality of distances from the vehicle to the plurality of objects, a plurality of Doppler velocities of a plurality of reflection signals, and a plurality of reflection intensities of the plurality of reflection signals, and calculates a plurality of azimuth angles of the sidewall with respect to the vehicle, and a plurality of distances from the vehicle to the sidewall when it is determined that the vehicle is running on a road having the sidewall, the plurality of azimuth angles, the plurality of distances, the plurality of Doppler velocities and the plurality of reflection intensities are calculated using the plurality of reflection signals in which a transmission signal reflected by the plurality of objects, the transmission signal which is transmitted by the radar device mounted in the vehicle; multiple reflection position detection circuitry which, in operation, detects a plurality of multiple reflection wave components caused by the sidewall and the vehicle from the plurality of reflection signals, based on the plurality of azimuth angles of the sidewall with respect to the vehicle and the plurality of distances from the vehicle to the sidewall; detection exclusion range setting circuitry which, in operation, removes the detected plurality of multiple reflection wave components from the plurality of reflection signals; and object detection circuitry which, in operation, detects a target including the plurality of objects using the plurality of reflection signals in which the plurality of multiple reflection wave components are removed.

It should be noted that general or specific embodiments may be implemented as a system, a method, an integrated circuit, a computer program, a storage medium, or any selective combination thereof.

According to the present disclosure, it is possible to detect an obstacle with high accuracy even when a vehicle is running on a road having a sidewall. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
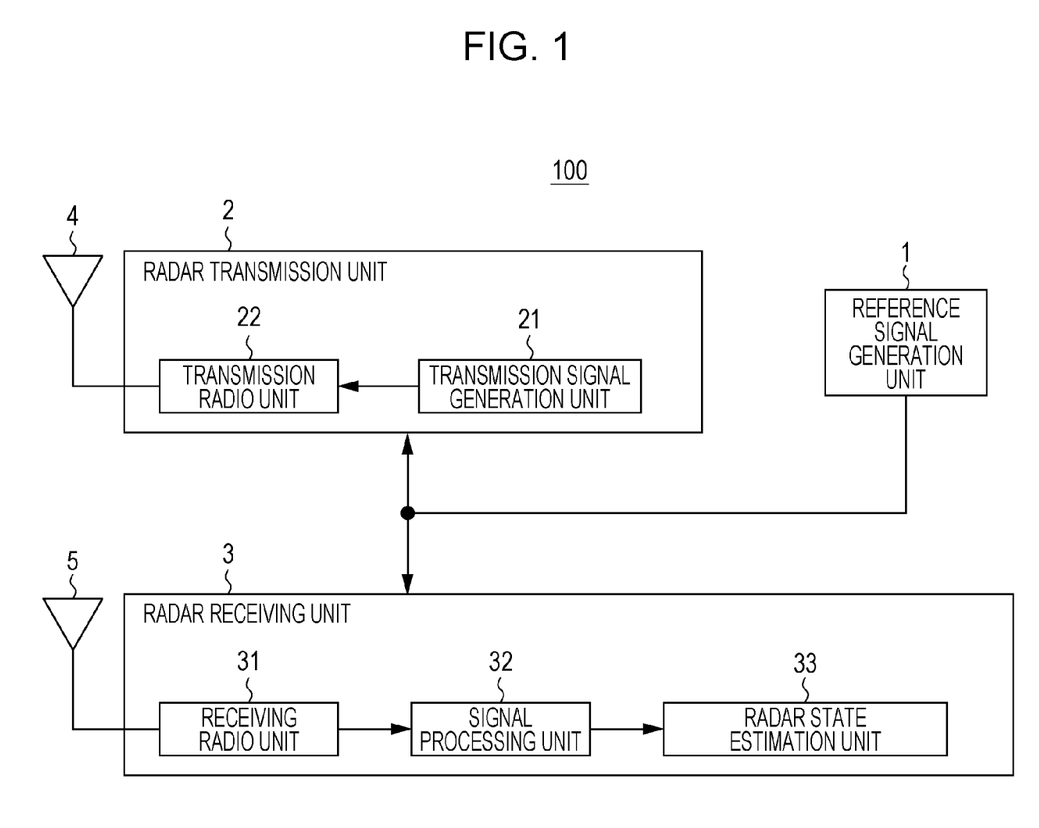
FIG. 1 is a block diagram illustrating an example of a configuration of a radar device according to an embodiment of the present disclosure.

Hereinafter, a radar device 100 according to an embodiment of the present disclosure will be described in detail. FIG. 1 is a block diagram illustrating an example of the configuration of the radar device 100 according to an embodiment of the present disclosure. The radar device 100 illustrated in FIG. 1 has a reference signal generation unit 1, a radar transmission unit 2, a radar receiving unit 3, a transmission antenna 4, and a receiving antenna 5.

The radar device 100 according to an embodiment of the present disclosure is assumed to be installed in a mobile object such as a vehicle that moves straight or moves along a curve (turns) along the direction of running. It is to be noted that a mobile object in which the radar device 100 is installed is not restricted to a vehicle, and may be, for instance, a two-wheeled automobile (motorcycle) or a robot that can walk on its own.

For instance, when the radar device 100 is installed in a vehicle, it is preferable that the radar device 100 be installed at a location where radar waves are easily transmitted and received, particularly, in a lateral direction, for instance, on the front lateral side of a vehicle, such as near a headlight. It is to be noted that the installation location of the radar device 100 is not restricted to a location near the headlight of a vehicle, and may be, for instance, a location near the bumper or the mirror of the vehicle. Hereinafter, the vehicle in which the radar device 100 is installed is called a vehicle 200.

First, the operation of the radar device 100 will be described briefly. The radar transmission unit 2 generates a radar transmission signal having a radio frequency based on a reference signal generated by the reference signal generation unit 1, and transmits the radar transmission signal from the transmission antenna 4. The transmitted radar transmission signal is reflected by an obstacle, and is received as a reflection wave signal (reflection signal) by the receiving antenna 5. The radar receiving unit 3 performs signal processing on the reflection wave signal received by the receiving antenna 5, and detects the azimuth angle and distance of the obstacle relative to the vehicle 200 using a result of the signal processing.

Next, each component of the radar device 100 will be described. The reference signal generation unit 1 is connected to the radar transmission unit 2 and the radar receiving unit 3 as illustrated in FIG. 1. The reference signal generation unit 1 generates a reference signal as a reference signal, and supplies the reference signal to the radar transmission unit 2 and the radar receiving unit 3 to synchronize the processing of the radar transmission unit 2 and the radar receiving unit 3.

The radar transmission unit 2 has a transmission signal generation unit 21 and a transmission radio unit 22. Based on the reference signal generated by the reference signal generation unit 1, the transmission signal generation unit 21 generates a transmission reference clock signal in which the frequency of the reference signal is multiplied by a predetermined factor. The transmission signal generation unit 21 generates a transmission signal in the baseband based on the generated transmission reference clock signal. The transmission signal in the baseband generated by the transmission signal generation unit 21 is, for instance, a coded pulse signal or a chirp pulse signal which is repeatedly transmitted in a cycle of a predetermined transmission period.

The transmission radio unit 22 generates a radar transmission signal in a carrier frequency band (for instance, the millimeter wave band) by up-converting the transmission signal generated by the transmission signal generation unit 21.

The transmission antenna 4 radiates the radar transmission signal generated by the transmission radio unit 22 to space. The receiving antenna 5 receives one or more reflection wave signals in which the radar transmission signal radiated from the transmission antenna 4 are reflected by an obstacle and returned. The one or more reflection wave signals (one or more radar received signals having a radio frequency) received by the receiving antenna 5 are inputted to the radar receiving unit 3. It is to be noted that at least the receiving antenna 5 is installed on the front or on the lateral side of a vehicle so that the viewing angle range (search range) of the radar device 100 covers the front and lateral directions of the vehicle. Here, the transmission antenna 4 and the receiving antenna 5 may each include a plurality of antennas.

The radar receiving unit 3 has a receiving radio unit 31, a signal processing unit 32, and a radar state estimation unit 33. The receiving radio unit 31 down-converts the one or more radar received signals received by the receiving antenna 5 to generate one or more received signals in the baseband.

The signal processing unit 32 obtains information on the transmission period of the radar transmission signal from the transmission signal generation unit 21, and calculates the correlation between one or more received signals inputted from the receiving radio unit 31 and a radar transmission signal transmitted by the radar transmission unit 2 in every transmission period. As a result of the calculation, the signal processing unit 32 determines a delay time in receiving one or more reflection wave signals, that is, a delay time from issuing of a command to transmit a radar transmission signal until one or more reflection wave signals are received.

The signal processing unit 32 then calculates a correlation calculation result for every delay time in receiving, and performs Doppler frequency analysis in which the calculation result is added coherently. Thus, the signal processing unit 32 obtains a coherent addition result for a plurality of Doppler frequency components for every delay time in receiving. It is to be noted that the Doppler frequency components provide information on the frequency variation that occurs in one or more reflection wave signals due to the Doppler effect when relative motion exists between an obstacle by which a radar transmission signal is reflected and the radar device 100 in the direction of the distance therebetween. Also, the Doppler frequency components each indicate a relative velocity of the radar device 100 in the direction of the distance from the reflecting obstacle.

In addition, the signal processing unit 32 uses the coherent addition result for the Doppler frequency components to calculate a power profile (reflection intensity) for azimuth, for Doppler frequency component, and for distance in one or more reflection wave signals. It is to be noted that the signal processing unit 32 may calculate a power profile when the coherent addition result for the Doppler frequency components is greater than or equal to a threshold value exceeding a noise level.

Furthermore, the signal processing unit 32 uses the calculated power profile to estimate the arrival direction of each of reflection wave signals and determine the relative velocity (Doppler velocity) of an obstacle with respect to the radar device 100. As a method of calculating the Doppler velocity, for instance, the signal processing unit 32 may convert each Doppler frequency component to a Doppler velocity component.

In addition, for each of one or more obstacles present in the viewing angle range of the radar device 100, the signal processing unit 32 uses reflection wave signals to measure the distance and azimuth (azimuth angle with respect to the radar device 100) to and of each obstacle, the Doppler velocity of each obstacle, and the power profile of reflection wave signals from each obstacle, then inputs measured values to the radar state estimation unit 33.

The radar state estimation unit 33 estimates a state around the vehicle based on the power profile for azimuth, for Doppler frequency component, and for distance in reflection wave signals outputted from the signal processing unit 32. Specifically, the radar state estimation unit 33 determines whether or not multiple reflection has occurred based on the power profile. The radar state estimation unit 33 then generates a power profile unaffected by multiple reflection by removing multiple reflection components from the power profile obtained by the signal processing unit 32. By using thus obtained power profile unaffected by multiple reflection, the radar state estimation unit 33 is able to perform object detection accurately around the vehicle. Detailed operation of the radar state estimation unit 33 will be described later.

[Details of Processing in Radar State Estimation Unit 33]

Figure 2:
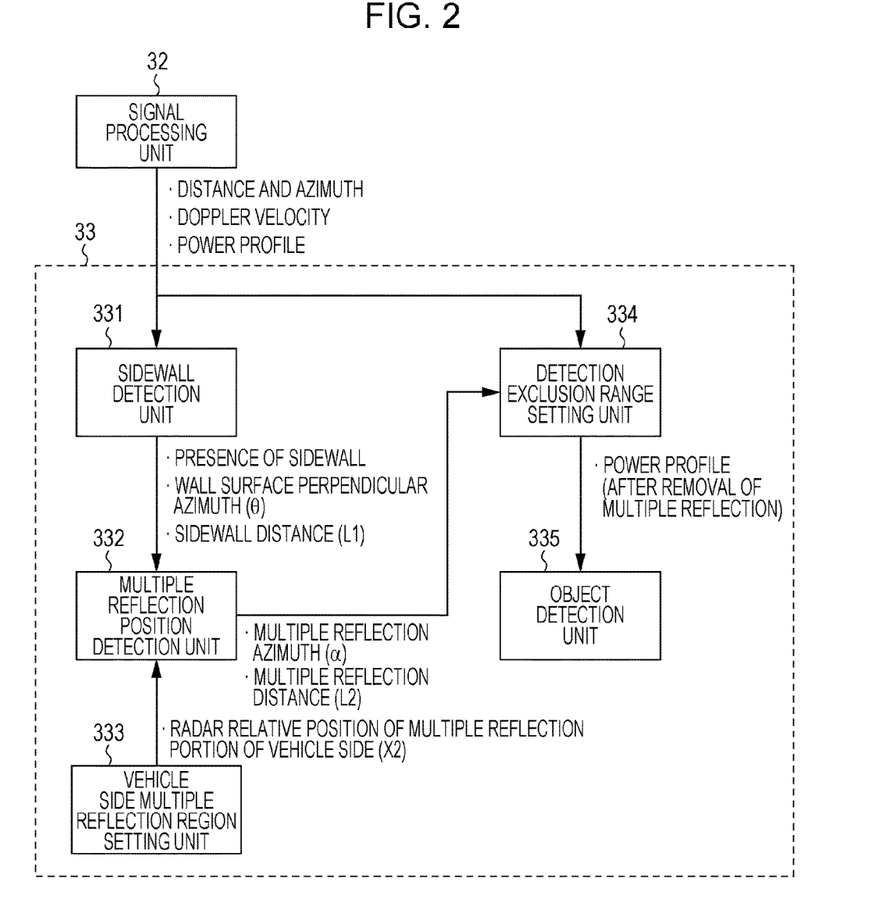
FIG. 2 is a block diagram illustrating a flow of processing in a radar state estimation unit.

Next, the details of the processing in the radar state estimation unit 33 will be described. FIG. 2 is a block diagram illustrating the flow of processing in the radar state estimation unit 33. As illustrated in FIG. 2, the radar state estimation unit 33 has a sidewall detection unit 331, a multiple reflection position detection unit 332, a vehicle side multiple reflection region setting unit 333, a detection exclusion range setting unit 334, and an object detection unit 335.

The sidewall detection unit 331 identifies a multiple reflection component based on the power profile inputted from the signal processing unit 32. A method of identifying a multiple reflection component will be described in the following.

Figure 3A:
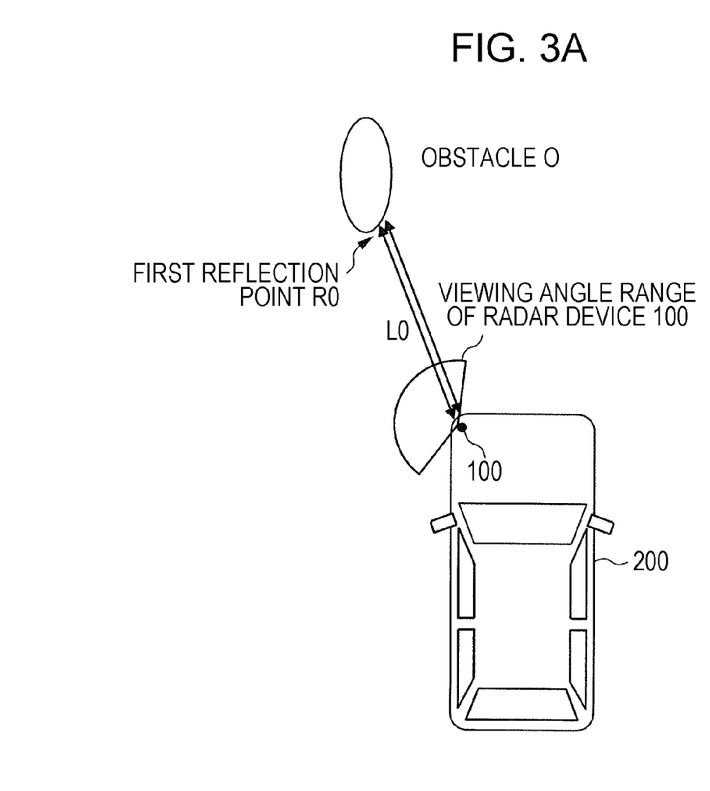
FIG. 3A provides an illustration for explaining a situation in which a multiple reflection wave occurs.
Figure 3B:
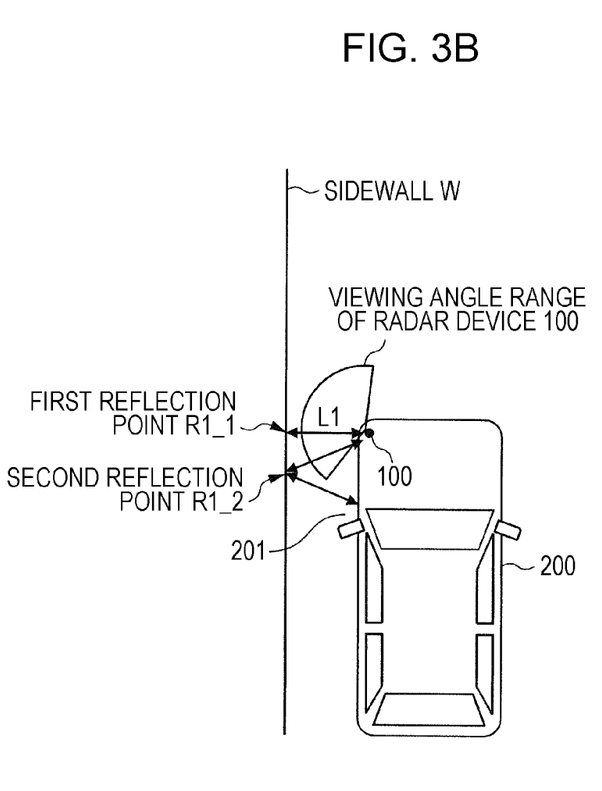
FIG. 3B provides another illustration for explaining a situation in which a multiple reflection wave occurs.

First, a situation in which a multiple reflection wave occurs will be described. FIG. 3A provides an illustration for explaining a situation in which a multiple reflection wave occurs. FIG. 3A is an illustration for explaining a situation in which a multiple reflection wave occurs between the radar device 100 provided on the front left side of the vehicle 200, and an obstacle O (for instance, another vehicle) present left diagonally in front of the vehicle 200. On the other hand, FIG. 3B provides another illustration for explaining a situation in which a multiple reflection wave occurs. FIG. 3B is an illustration for explaining a situation in which a multiple reflection wave occurs between the radar device 100 provided on the front left side of the vehicle 200, and a sidewall W present on left side of a road on which the vehicle is running.

In FIG. 3A, a radar transmission signal radiated from the radar device 100 is reflected near a reflection point R0 of the obstacle O and is received by the radar device 100. In this process, part of the radar transmission signal may be reflected by a vehicle body portion near the radar device 100 of the vehicle 200 and may be radiated to the surrounding. In this manner, a radar transmission signal reflected by the body of the vehicle 200 may be reflected again near the reflection point R0 of the obstacle O and may be received by the radar device 100. In the present embodiment, such a reflection wave is referred to as a multiple reflection wave.

Although the multiple reflection wave has been described as a reflection wave which is reflected twice by the obstacle O, the multiple reflection wave also includes a reflection wave in which reflection is repeated, for instance, three times or more between the obstacle O and the body of the vehicle 200. However, a reflection wave in which reflection is repeated three times or more has a low intensity due to attenuation in many cases, and thus a reflection wave having a predetermined intensity or low, for instance, may not be treated as a multiple reflection wave.

Figure 4:
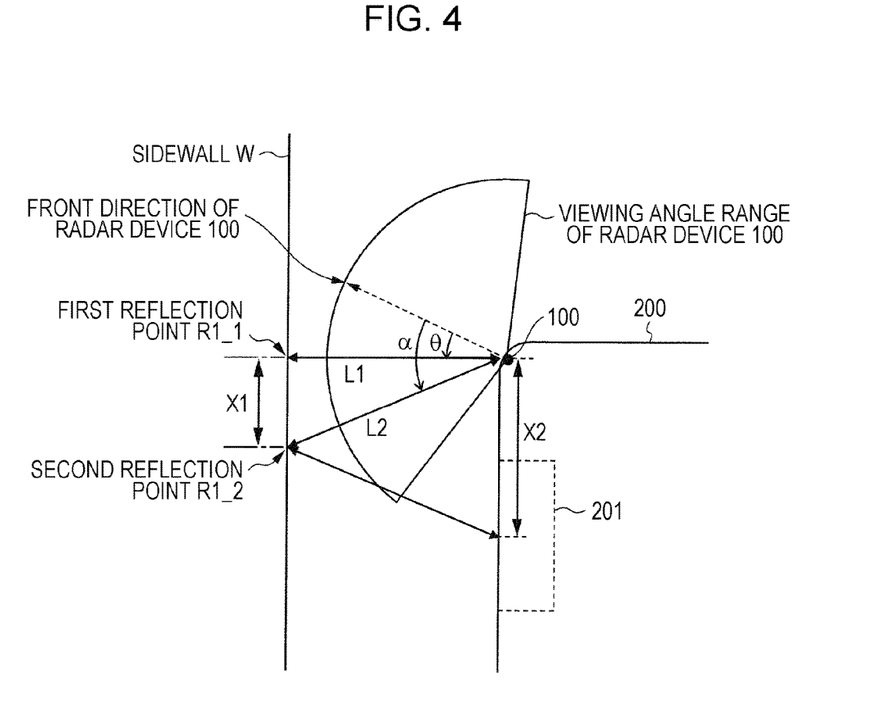
FIG. 4 is an enlarged illustration of a positional relationship between a vehicle and a sidewall illustrated in FIG. 3B.

On the other hand, FIG. 3B illustrates a case where the vehicle 200 is running on a road where the sidewall W is provided on the left side, for instance. FIG. 4 is an enlarged illustration of the positional relationship between the vehicle 200 and the sidewall illustrated in FIG. 3B. Here, the sidewall W is, for instance, a sound insulation wall or a protective wall which is present in a side strip of a road restricted to vehicles and which is sufficiently higher the height of vehicles, or a guardrail provided in the vicinity of an intersection other than a road restricted to vehicles. In other words, the sidewall W is a wall surface in which reflection points, which reflect a radar transmission signal, are present at nearly the same height as the height of the radar device 100 installed in the vehicle 200.

As illustrated in FIG. 3B and FIG. 4, a radar transmission signal radiated from the radar device 100 is reflected by the vicinity of a first reflection point R1_1 of the sidewall W which is in the lateral direction to the vehicle 200, and is received by the radar device 100. Thus, the radar device 100 is able to measure a distance L1 from the vehicle 200 to the sidewall W. Here, as illustrated in FIG. 3B and FIG. 4, when the sidewall W is present in the surrounding of the vehicle 200, two types of multiple reflection wave may be detected by the radar device 100 as described in the following.

One type is a multiple reflection wave that occurs in a situation where a transmission wave is once reflected by the vicinity of the first reflection point R1_1 of the sidewall W similarly to the above-described FIG. 3A, then a reflection wave is reflected by the vehicle body of the vehicle 200, and the reflection wave is reflected again by the vicinity of the first reflection point R1_1 of the sidewall W. Another type is a multiple reflection wave that occurs in a situation where part of the reflection wave from the sidewall W is reflected on part of the vehicle body of the vehicle 200 without being received by the radar device 100 as illustrated in FIG. 3B, and is reflected again by the vicinity of a second reflection point R1_2 of the sidewall W. Here, a situation where a reflection wave is reflected on part of the vehicle body of the vehicle 200 without being received by the radar device 100 often occurs in the vicinity of, for instance, a tire house 201 of the vehicle 200. In particular, a reflection wave of a radar transmission signal transmitted from the radar device 100 provided on the front left side of the vehicle 200 may be intensely reflected by the vicinity of the tire house 201 near the front left side of the vehicle 200. As illustrated in FIG. 4, when the distance between the radar device 100 and the tire house 201 is assumed to be X2, distance X1 between the first reflection point R1_1 and the second reflection point R1_2 is approximately half the distance X2.

Here, as illustrated in FIG. 3B and FIG. 4, a multiple reflection wave via the second reflection point R1_2 only occurs in the case where the sidewall W is present laterally to the vehicle 200. Therefore, when a reflection wave by the second reflection point R1_2 is identified, it may be determined that the vehicle 200 is running on a road having a sidewall.

Figure 5:
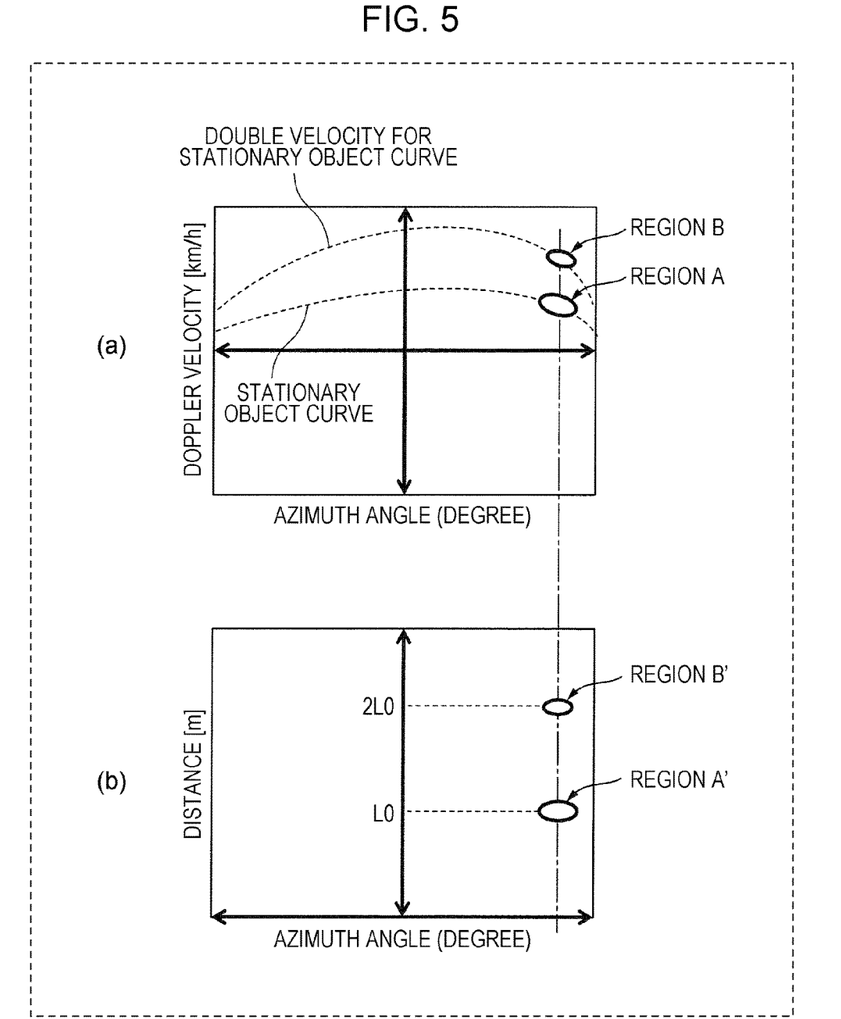
FIG. 5 illustrates an example of power profiles in a detection range of a radar device when a multiple reflection wave is caused by another obstacle.

FIG. 5 illustrates an example of power profiles in a detection range of the radar device 100 when a multiple reflection wave is caused by another obstacle. FIG. 5(a) illustrates a power profile for azimuth angle and for Doppler velocity with respect to the radar device 100, the power profile being determined from a power profile calculated based on the radar received signal (including a multiple reflection wave) when a multiple reflection wave is caused by the obstacle O. In FIG. 5(a), the horizontal axis represents the azimuth angle of a target for detection with respect to the radar device 100, and the vertical axis represents the Doppler velocity of a target for detection.

On the other hand, FIG. 5(b) illustrates a power profile for azimuth angle with respect to the radar device 100 and for the distance from the radar device 100 when a multiple reflection wave is caused by the obstacle O. In FIG. 5(b), the horizontal axis represents the azimuth angle of a target for detection with respect to the radar device 100, and the vertical axis represents the distance from the radar device 100 to a target for detection.

In FIG. 5, substantially ellipse-shaped regions A, B, A', B' each correspond to the Doppler velocity (or distance) and the azimuth of a target (object) for detection which has reflected a reflection wave (object), and the sizes (areas) of the regions each represent a reflection intensity. The regions A and A' do not include a multiple reflection wave signal, in other words, the regions A and A' each correspond to a target for detection which has reflected a radar received signal of a primary reflection wave. The regions B and B' each correspond to a target for detection which has reflected a multiple reflection wave signal caused by the obstacle O. As illustrated in FIG. 5(a) and FIG. 5(b), the regions A and A' are greater than the regions B and B', and thus it is estimated that the regions A and A' are each a region corresponding to a primary reflection wave.

In multiple reflection caused by the obstacle O, the reflection points of a radar received signal and a multiple reflection wave in the obstacle O are nearly the same as illustrated in FIG. 3A, and thus the regions A and B have the same value of azimuth angle as illustrated in FIG. 5($a$). As illustrated in FIG. 3A, the multiple reflection wave goes back and forth twice between the radar device 100 and the obstacle O, and thus as illustrated in FIG. 5($b$), the distance to a target for detection in the region B' corresponding to a multiple reflection wave is twice the value of L0 which is the distance from the radar device 100 to the obstacle O.

Figure 6:
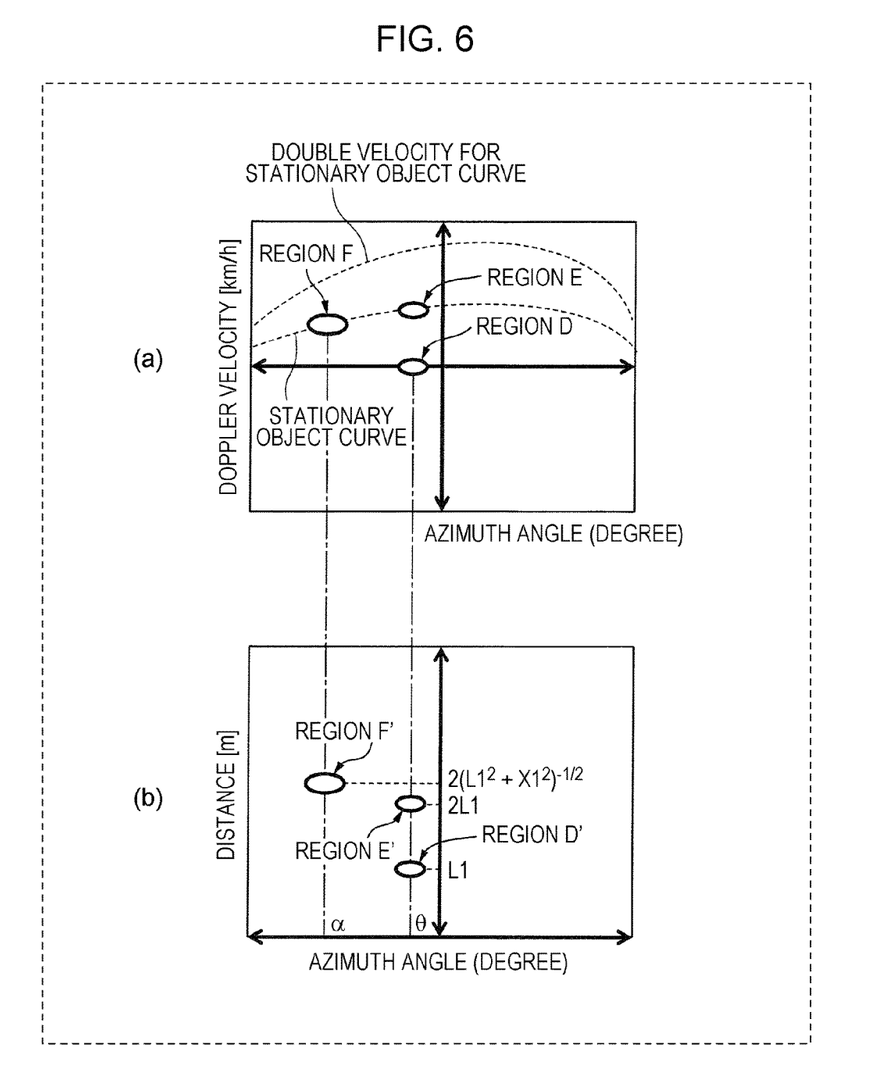
FIG. 6 illustrates another example of power profiles in a detection range of radar device when a multiple reflection wave is caused by a sidewall.

Next, FIG. 6 illustrates another example of power profiles in a detection range of radar device 100 when a multiple reflection wave is caused by the sidewall. FIG. 6($a$) illustrates a power profile for azimuth angle and for Doppler velocity with respect to the radar device 100, the power profile being determined from a power profile calculated based on the radar received signal (including a multiple reflection wave) when a multiple reflection wave is caused by the sidewall W. In FIG. 6($a$), the horizontal axis represents the azimuth angle of a target for detection with respect to the radar device 100, and the vertical axis represents the Doppler velocity of a target for detection.

On the other hand, FIG. 6($b$) illustrates a power profile for azimuth angle with respect to the radar device 100 and for the distance from the radar device 100 when a multiple reflection wave is caused by the sidewall W. In FIG. 6($b$), the horizontal axis represents the azimuth angle of a target for detection with respect to the radar device 100, and the vertical axis represents the distance from the radar device 100 to a target for detection.

In FIG. 6, substantially ellipse-shaped regions D, E, F, D', E', F' each correspond to the azimuth and Doppler velocity (or distance) of a target for detection, for which a reflection wave has been observed, and the sizes (areas) of the regions each represent a reflection intensity. The regions D and D' are each a region corresponding to a radar received signal (of a primary reflection wave) including no multiple reflection wave signal. Also, the regions E and E' are each a region corresponding to a multiple reflection wave signal via the vicinity of the first reflection point R1_1 of the sidewall W. The regions F and F' are each a region corresponding to a multiple reflection wave signal via the vicinity of the second reflection point R1_2 of the sidewall W. Since the strength of the regions D and D' are greater than any of the strength of the regions E and E', F and F', it is estimated that the regions D and D' are each a region corresponding to a primary reflection wave.

Here, as illustrated in FIG. 4, a multiple reflection wave via the second reflection point R1_2 occurs when the sidewall W is present around the vehicle 200. Therefore, when regions F and F' each corresponding to a multiple reflection wave via the second reflection point R1_2 are present as a result of analysis of a radar received signal, conducted by the radar state estimation unit 33, it is estimated that the sidewall W is present around the vehicle 200.

In FIG. 6, the regions D and D' are each a region corresponding to a radar received signal including no multiple reflection wave signal as described above. Specifically, the regions D and D' each correspond to a radar transmission signal which is transmitted in the lateral direction to the vehicle 200 from the radar device 100 illustrated in FIG. 4 and which is reflected as a reflection wave signal by the first reflection point R1_1 of the sidewall W. Specifically, the Doppler velocity corresponding to the region D is approximately 0 km/h, the azimuth angle θ corresponding to the regions D and D' is the angle from the front direction of the radar device 100 to the lateral direction to the vehicle 200, and the distance corresponding to region D' is equal to the shortest distance L1 from the vehicle 200 to the sidewall W.

In FIG. 6, the regions E and E' are each a region corresponding to a multiple reflection wave signal via the first reflection point R1_1 of the sidewall W as described above. Therefore, as illustrated in FIG. 6($b$), the distance corresponding to the region E' is equal to 2L1 which is twice the shortest distance L1 from the vehicle 200 to the sidewall W.

In FIG. 6, the regions F and F' are each a region corresponding to a multiple reflection wave signal via the second reflection point R1_2 of the sidewall W. Therefore, as illustrated in FIG. 6($a$), the region F is on a stationary object curve with the azimuth angle of α. It is to be noted that in a coordinate system having the vertical axis corresponding to Doppler velocity and the horizontal axis corresponding to azimuth angle illustrated in FIG. 6($a$), a stationary object curve is a curve obtained by connecting the points in which the Doppler velocity is the same as the velocity component of the vehicle 200 in the direction of running, and the azimuth angle θ is the value obtained by multiplying cos θ by the Doppler velocity of the vehicle 200 in the direction of running. The azimuth angle α corresponding to the regions F and F' is the angle formed by a target for detection (in this case, the second reflection point R1_2) with respect to the front direction of the radar device 100 as illustrated in FIG. 4. The azimuth angle α corresponding to the regions F and F' can be expressed by the following Expression (1).

$$\alpha = \theta + \tan^{-1}(L1/X1) \quad (1)$$

As described above, the azimuth angle θ is the angle formed by the front direction of the radar device 100 and the first reflection point R1_1 in the lateral direction to the vehicle 200. Also, as described above, the distance X1 between the first reflection point R1_1 and the second reflection point R1_2 is approximately half the distance X2 between the radar device 100 and the tire house 201. As described above, the shortest distance L1 from the vehicle 200 to the sidewall W is obtainable based on the region D'. From the above, it is possible to calculate the azimuth angle α with high accuracy.

Also, according to FIG. 4, the distance corresponding to the region F', that is, the distance L2 from the radar device 100 to the second reflection point R1_2 is equal to the equal sides of an isosceles triangle with the height of L1 and the base of X2 (=2×1). Therefore, the distance L2 can be expressed by the following Expression (2).

$$L2 = \sqrt{L1^2 + (X2/2)^2} = \sqrt{L1^2 + X1^2} \quad (2)$$

Hereinafter, the sidewall detection unit 331 will be described again. The side wall detection unit 331 generates a distribution of power profile for the Doppler frequency, for the distance from the radar device 100, and for the azimuth angle as illustrated in FIG. 5 or FIG. 6.

In the case where the following two conditions are satisfied at the same time, the side wall detection unit 331 determines that the vehicle is running on a road having the sidewall W. One of the two conditions is that a region (for instance, the region D illustrated in FIG. 6) with the Doppler velocity of approximately 0 km/h and a high power profile is observed in the direction of θ, which is the lateral direction (perpendicular to the direction of running of the vehicle) to the vehicle 200. The Doppler velocity of 0 km/h indicates that an object is not coming closer to the vehicle 200 or moving away from the vehicle 200. In other words, the Doppler velocity of 0 km/h indicates that an object is moving parallel to the direction of movement of the vehicle 200 or an object extends parallel to the direction of movement of the vehicle 200.

The other of the two conditions is that a region (for instance, the region F illustrated in FIG. 6) with the Doppler velocity of approximately the velocity of the vehicle is observed in the direction of a in which the second reflection point R1_2 is located rearwardly of the first reflection point R1_1 with respect to the vehicle 200. Here, the region with the Doppler velocity of approximately the velocity of the vehicle is located on a curve representing a stationary object curve as illustrated in FIG. 6(a).

The case where these two conditions are satisfied at the same time is that an object is present parallel to the direction of movement of the vehicle 200. Such a situation is equivalent to the situation where the sidewall W is present laterally to the vehicle 200.

The sidewall detection unit 331, when determining that the vehicle is running on a road having the sidewall W, calculates the distance L1 from the radar device 100 to the sidewall W and the azimuth angle θ of the first reflection point R1_1 with respect to the radar device 100 by the above-described method. Hereinafter, the distance from the radar device 100 to the sidewall is referred to as a sidewall distance L1. Also, the azimuth angle of the first reflection point R1_1 with respect to the radar device 100 is referred to as a wall surface perpendicular azimuth θ.

Next, the multiple reflection position detection unit 332 obtains a result of determination as to the presence of a sidewall from the sidewall detection unit 331, and the sidewall distance L1 and the wall surface perpendicular azimuth θ when the sidewall W is present. The multiple reflection position detection unit 332 then uses the distance X2 from the radar device 100 to the tire house 201 to calculate the azimuth angle α of the second reflection point R1_2 with respect to the radar device 100, and the distance L2 from the radar device 100 to the second reflection point R1_2 of the sidewall W. Hereinafter, the azimuth angle of the second reflection point R1_2 with respect to the radar device 100 is referred to as a multiple reflection azimuth α. Also, the distance from the radar device 100 to the second reflection point R1_2 of the sidewall W is referred to as a multiple reflection distance L2. The multiple reflection position detection unit 332 then calculates a multiple reflection wave component via the vicinity of the second reflection point R1_2 in a power profile based on the calculated multiple reflection distance L2 and multiple reflection azimuth α.

It is to be noted that the distance X2 from the radar device 100 to the tire house 201, which is a parameter used by the multiple reflection position detection unit 332 to calculate the multiple reflection azimuth α and the multiple reflection distance L2, is calculated by the vehicle side multiple reflection region setting unit 333 in advance. The vehicle side multiple reflection region setting unit 333 sets the distance X2 from the radar device 100 to the tire house 201 in advance based on known specifications of the vehicle 200.

The detection exclusion range setting unit 334 removes the multiple reflection wave component, calculated by the multiple reflection position detection unit 332, via the vicinity of the second reflection point R1_2 in the power profile based on power profile information inputted from the signal processing unit 32. In this manner, the detection exclusion range setting unit 334 is able to obtain a power profile unaffected by multiple reflection waves.

The object detection unit 335 detects an obstacle using the power profile with the multiple reflection wave component removed. This enables detection of the presence of an obstacle with the effect of the sidewall W removed, and thus the accuracy in detecting an object improves. The information on the object detected by the object detection unit 335, that is, the obstacle information for the vehicle 200 is outputted to a warning section which is not illustrated, and the warning section notifies a driver of the vehicle 200 based on a predetermined determination criterion. The predetermined determination criterion is, for instance, a criterion as to whether or not the paths of the vehicle 200 and the detected object cross each other.

As described above, the radar device 100 in the present embodiment includes the sidewall detection unit 331 that determines whether or not the vehicle 200 is running on a road having a sidewall, based on the Doppler velocity of a reflection wave, the azimuth of a reflection point of an object, and a reflection intensity (power profile); the multiple reflection position detection unit 332 that identifies a multiple reflection wave component, caused by the sidewall W and the vehicle 200, in the reflection wave based on the Doppler velocity of the reflection wave, the azimuth of a reflection point, and the reflection intensity when it is determined by the sidewall detection unit 331 that the vehicle is running on a road having the sidewall W; and the detection exclusion range setting unit 334 that removes from the reflection wave the multiple reflection wave component caused by the sidewall W and the vehicle 200.

The sidewall detection unit 331 then determines that the vehicle 200 is running on a road having the sidewall W based on the reflection intensity for the Doppler velocity and for the azimuth angle of a reflection wave in the case where the first reflection point, which reflects a transmission wave and in which the Doppler velocity is approximately 0, is present in the lateral direction to the vehicle 200, the reflection intensity of the component of a first reflection wave which is a reflection wave via the first reflection point is higher than a predetermined intensity, a second reflection point, which reflects a transmission wave, is present with an azimuth indicating rearward of the first reflection point with respect to the vehicle, and the reflection intensity of the component of a second reflection wave which is a reflection wave via the second reflection point is lower than the reflection intensity of the first reflection wave component.

Here, the first reflection point R1_1 in the lateral direction to the vehicle 200 is a reflection point that reflects the primary reflection wave when the sidewall W is present laterally to the vehicle 200. Here, the Doppler velocity of 0 means that the movement speed of an object coming closer to the vehicle 200 or moving away from the vehicle 200 is 0. Therefore, the first reflection point R1_1 is a reflection point that occurs in an object which moves parallel to the direction of movement of the vehicle 200 or an object which extends parallel to the direction of movement of the vehicle 200. In the case where the second reflection point R1_2 is present with an azimuth indicating rearward of the first reflection point R1_1 with respect to the vehicle 200, the component of the second reflection wave which is a reflection wave via the second reflection point R1_2 is a multiple reflection wave component which occurs when the sidewall W is present.

As described above, the sidewall detection unit 331 is able to determine that the vehicle 200 is running on a road having a sidewall in the case where the first reflection point, which reflects a transmission wave and in which the Doppler velocity is 0, is present in the lateral direction to the vehicle 200, the reflection intensity of the component of a first reflection wave which is a reflection wave via the first reflection point is higher than a predetermined intensity, a second reflection point, which reflects a transmission wave, is present with an azimuth indicating rearward of the first reflection point with respect to the vehicle, and the reflection intensity of the component of a second reflection wave which is a reflection wave via the second reflection point is lower than the reflection intensity of the first reflection wave component.

In the radar device 100 in the present embodiment, when the sidewall detection unit 331 determines that the vehicle 200 is running on the road having the sidewall W, the azimuth angle α of the second reflection point R1_2 with respect to the vehicle 200 and the distance L2 from the vehicle to the second reflection point R1_2 are calculated based on the azimuth angle θ of the first reflection point R1_1 with respect to the vehicle 200 and the distance L1 from the vehicle 200 to the first reflection point R1_1, and the multiple reflection position detection unit 332 calculates the component of the second reflection wave via the second reflection point R1_2 in the reflection wave based on the azimuth angle α of the second reflection point R1_2 with respect to the vehicle 200 and the distance L2 from the vehicle 200 to the second reflection point R1_2, then determines that the component of the second reflection wave is the multiple reflection wave component caused by the sidewall W and the vehicle 200.

In this manner, it is possible to identify a multiple reflection wave component which is of the reflection wave component received by the radar device 100 and which is caused by the sidewall W and the vehicle 200. Since the detection exclusion range setting unit 334 removes the multiple reflection wave component caused by the sidewall W and the vehicle 200 from the reflection wave component, the object detection unit 335 is able to perform object detection using the reflection wave component in which the effect of a reflection wave from the sidewall W is removed. Thus, it is possible to detect an object with high accuracy even when the vehicle 200 is running on a road having a sidewall.

Various aspects of the embodiment according to the present disclosure include the following.

An object detection device according to a first disclosure provides an object detection device including: sidewall detection circuitry which, in operation, determines whether or not a vehicle which is mounted a radar device is running on a road having a sidewall including in a plurality of objects, based on a plurality of azimuth angles of the plurality of objects with respect to the vehicle, a plurality of distances from the vehicle to the plurality of objects, a plurality of Doppler velocities of a plurality of reflection signals, and a plurality of reflection intensities of the plurality of reflection signals, and calculates a plurality of azimuth angles of the sidewall with respect to the vehicle, and a plurality of distances from the vehicle to the sidewall when it is determined that the vehicle is running on a road having the sidewall, the plurality of azimuth angles, the plurality of distances, the plurality of Doppler velocities and the plurality of reflection intensities are calculated using the plurality of reflection signals in which a transmission signal reflected by the plurality of objects, the transmission signal which is transmitted by the radar device mounted in the vehicle; multiple reflection position detection circuitry which, in operation, detects a plurality of multiple reflection wave components caused by the sidewall and the vehicle from the plurality of reflection signals, based on the plurality of azimuth angles of the sidewall with respect to the vehicle and the plurality of distances from the vehicle to the sidewall; detection exclusion range setting circuitry which, in operation, removes the detected plurality of multiple reflection wave components from the plurality of reflection signals; and object detection circuitry which, in operation, detects a target including the plurality of objects using the plurality of reflection signals in which the plurality of multiple reflection wave components are removed.

An object detection device according to a second disclosure provides the object detection device according to the first disclosure in which the sidewall detection circuitry determines that the vehicle is running on the road having the sidewall in the case where (i) a first reflection signal with a Doppler velocity of 0 is present out of the plurality of reflection signals in a direction perpendicular to a direction of running of the vehicle as a first azimuth angle, and a reflection intensity of the first reflection signal is higher than a predetermined intensity, and (ii) a second reflection signal having a second azimuth angle is larger than the first azimuth angle is present out of the plurality of reflection signals, and a Doppler velocity of the second reflection signal is the same as a velocity of the vehicle in the direction of running.

An object detection device according to a third disclosure provides the object detection device according to the second disclosure in which the sidewall detection circuitry, when determining that the vehicle is running on the road having the sidewall, calculates the second azimuth angle of the sidewall with respect to the vehicle according to the second reflection signal, and a second distance from the vehicle to the sidewall according to the second reflection signal based on the first azimuth angle and a first distance from the vehicle to the sidewall according to the first reflection signal, and the multiple reflection position detection circuitry calculates a first multiple reflection wave components according to the first reflection signal out of the reflection signals by using the first azimuth angle and the first distance, and calculates a second multiple reflection wave components according to the second reflection signal out of the reflection signals by using the second azimuth angle and the second distance.

An object detection method according to a fourth disclosure provides An object detection method including: determining by sidewall detection circuitry whether or not a vehicle which is mounted a radar device is running on a road having a sidewall including in a plurality of objects, based on a plurality of azimuth angles of the plurality of objects with respect to the vehicle, a plurality of distances from the vehicle to the plurality of objects, a plurality of Doppler velocities of a plurality of reflection signals, and a plurality of reflection intensities of the plurality of reflection signals; calculating by sidewall detection circuitry a plurality of azimuth angles of the sidewall with respect to the vehicle, and a plurality of distances from the vehicle to the sidewall when it is determined that the vehicle is running on a road having the sidewall, the plurality of azimuth angles of the plurality of objects with respect to the vehicle, the plurality of distances from the vehicle to the plurality of the objects, the plurality of Doppler velocities of the plurality of reflection signals, and the plurality of reflection intensities of the plurality of reflection signals are calculated using the reflection signals in which a transmission signal reflected by the plurality of objects, the transmission signal which is transmitted by the radar device mounted in the vehicle; detecting a plurality of multiple reflection wave components caused by the sidewall and the vehicle from the plurality of reflection signals by multiple reflection position detection circuitry, based on the plurality of azimuth angles of the sidewall with respect to the vehicle and the plurality of distances from the vehicle to the sidewall; removing the detected plurality of multiple reflection wave components from the plurality of reflection signals by detection exclusion range setting circuitry; and detecting a target including the plurality of objects by an object detection circuitry using the plurality of reflection signals in which the plurality of multiple reflection wave components are removed.

An object detection method according to a fifth disclosure provides the object detection method according to the fourth disclosure in which the determining as to the sidewall determines that the vehicle is running on the road having the sidewall in the case where (i) a first reflection signal with a Doppler velocity of 0 is present out of the plurality of reflection signals in a direction perpendicular to a direction of running of the vehicle as a first azimuth angle, and a reflection intensity of the first reflection signal is higher than a predetermined intensity, and (ii) a second reflection signal having a second azimuth angle is larger than the first azimuth angle is present out of the plurality of reflection signals, and a Doppler velocity of the second reflection signal is the same as a velocity of the vehicle in the direction of running.

An object detection method according to a sixth disclosure provides the object detection method according to the fifth disclosure in which when the determining as to the sidewall determines that the vehicle is running on the road having the sidewall, a second azimuth angle of the object with respect to the vehicle according to the second reflection signal, and a second distance from the vehicle to the sidewall according to the second reflection signal are calculated based on the first azimuth angle and a first distance from the vehicle to the sidewall according to the first reflection signal, and in the detecting of the plurality of multiple reflection wave components, a first multiple reflection wave components according to the first reflection signal out of the reflection signals is calculated by using the first azimuth angle and the first distance, and a second multiple reflection wave components according to the second reflection signal out of the reflection signals is calculated by using the second azimuth angle and the second distance.

Although various embodiments have been described with reference to the drawings in the above, it goes without saying that the present disclosure is not limited to those examples. It is apparent that various modifications and alterations will occur to those skilled in the art within the scope of the appended claims, and it should be understood that those modifications and alterations naturally fall within the technical scope of the present disclosure. In a range without departing from the spirit of the present disclosure, the components in the above embodiments may be combined in any manner.

In the above embodiments, the present disclosure has been described by taking an example having a configuration in which hardware is used. The present disclosure, however, may be implemented by software in coordination with hardware.

Each of the functional blocks used for the description of the above embodiments is typically implemented as an LSI which is an integrated circuit having an input terminal and an output terminal. The functional blocks may be individually implemented as a single chip, or a single chip may be implemented to include part or all of the functional blocks.

Here, the term LSI is used, however, the term IC, system LSI, super LSI, or ultra LSI may be used depending on the degree of integration.

Also, the technique for circuit integration is not limited to LSI, and the circuit integration may be achieved using a dedicated circuit or a general-purpose processor. A field programmable gate array (FPGA) which is programmable after an LSI is manufactured, or a reconfigurable processor for which connection and setup of the circuit cells inside an LSI are reconfigurable may be utilized.

Furthermore, in the case where new technology of circuit integration which replaces the LSI is invented due to the progress of semiconductor technology or other emerging technologies, functional blocks may be naturally integrated using the new technology. Application of biotechnology may have such potential.

The present disclosure is preferably applied to an object detection device that is capable of setting a detection range in which an object around a vehicle is detected.

What is claimed is:
1. An object detection device to be mounted in a vehicle, the object detection device comprising:
   a transmitter configured to transmit a transmission signal;
   a receiver configured to receive a plurality of reflection signals that are the transmission signal reflected by a plurality of objects;
   sidewall detection circuitry configured to determine whether or not the vehicle is running on a road having a sidewall based on a plurality of azimuth angles of the plurality of objects with respect to the vehicle, a plurality of reflection intensities of the plurality of reflection signals, and a plurality of Doppler velocities of the plurality of reflection signals;
   multiple reflection position detection circuitry configured to detect a plurality of multiple reflection components among the plurality of reflection signals based on the plurality of azimuth angles of the plurality of objects with respect to the vehicle, the plurality of reflection intensities of the plurality of reflection signals, and the plurality of Doppler velocities of the plurality of reflection signals, when the sidewall detection circuitry determines that the vehicle is running on the road having the sidewall, the plurality of multiple reflection components being reflection signals caused by a multiple reflection between the sidewall and the vehicle;
   detection exclusion range setting circuitry configured to remove the plurality of multiple reflection components from the plurality of reflection signals; and
   object detection circuitry configured to detect a target based on the plurality of reflection signals removed of the plurality of multiple reflection components, wherein
   the sidewall detection circuitry determines that the vehicle is running on the road having the sidewall in a case where:
   (i) a first reflection signal with a Doppler velocity of 0 is present in the plurality of reflection signals in a direction perpendicular to a direction of running of the vehicle as a first azimuth angle, and a reflection intensity of the first reflection signal is higher than a predetermined intensity, and
   (ii) a second reflection signal having a second azimuth angle, greater than the first azimuth angle, is present in the plurality of reflection signals, and a reflection intensity of the second reflection signal is lower than the reflection intensity of the first reflection signal.

2. The object detection device according to claim 1, wherein:

the sidewall detection circuitry, when determining that the vehicle is running on the road having the sidewall, calculates the second azimuth angle of the sidewall with respect to the vehicle according to the second reflection signal, and a second distance from the vehicle to the sidewall according to the second reflection signal based on the first azimuth angle and a first distance from the vehicle to the sidewall according to the first reflection signal, and the multiple reflection position detection circuitry calculates a first multiple reflection components according to the first reflection signal of the reflection signals by using the first azimuth angle and the first distance, and calculates a second multiple reflection components according to the second reflection signal of the reflection signals by using the second azimuth angle and the second distance.

3. An object detection method performed by object detection device to be mounted in a vehicle, the object detection method comprising:

transmitting a transmission signal;

receiving a plurality of reflection signals that are the transmission signal reflected by a plurality of objects;

determining whether or not the vehicle is running on a road having a sidewall based on a plurality of azimuth angles of the plurality of objects with respect to the vehicle, a plurality of reflection intensities of the plurality of reflection signals, and a plurality of Doppler velocities of the plurality of reflection signals;

detecting a plurality of multiple reflection components among the plurality of reflection signals based on the plurality of azimuth angles of the plurality of objects with respect to the vehicle, the plurality of reflection intensities of the plurality of reflection signals, and the plurality of Doppler velocities of the plurality of reflection signals, when, in the determining, determined that the vehicle is running on the road having the sidewall, the plurality of multiple reflection components being reflection signals caused by a multiple reflection between the sidewall and the vehicle;

removing the plurality of multiple reflection components from the plurality of reflection signals; and detecting a target based on the plurality of reflection signals removed of the plurality of multiple reflection components, wherein:

determining whether or not the vehicle is running on the road having the sidewall includes determining that the vehicle is running on the road having the sidewall in a case where:

(i) a first reflection signal with a Doppler velocity of 0 is present in the plurality of reflection signals in a direction perpendicular to a direction of running of the vehicle as a first azimuth angle, and a reflection intensity of the first reflection signal is higher than a predetermined intensity, and (ii) a second reflection signal having a second azimuth angle, greater than the first azimuth angle, is present in the plurality of reflection signals, and a reflection intensity of the second reflection signal is lower than the reflection intensity of the first reflection signal.

4. The object detection method according to claim 3, wherein:

in the determining, when determining that the vehicle is running on the road having the sidewall, the second azimuth angle of the sidewall with respect to the vehicle according to the second reflection signal, and a second distance from the vehicle to the sidewall according to the second reflection signal are calculated based on the first azimuth angle and a first distance from the vehicle to the sidewall according to the first reflection signal, and in the detecting of the plurality of multiple reflection components, a first multiple reflection components according to the first reflection signal of the reflection signals is calculated by using the first azimuth angle and the first distance, and a second multiple reflection components according to the second reflection signal of the reflection signals is calculated by using the second azimuth angle and the second distance.

* * * * *